United States Patent [19]
Rashkovskiy et al.

[11] Patent Number: 5,798,948
[45] Date of Patent: *Aug. 25, 1998

[54] METHOD AND APPARATUS FOR VIDEO FILTERING

[75] Inventors: Oleg Rashkovskiy, Sunnyvale, Calif.; Jeffrey N. Kidder, Hillsboro, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 493,209

[22] Filed: Jun. 20, 1995

[51] Int. Cl.$^6$ .............................. H04N 5/217; H04N 9/66
[52] U.S. Cl. .................. 364/572; 364/715.02; 364/574; 364/575; 364/724.011; 364/734; 364/920.7; 395/200.77; 382/166; 382/232; 382/260; 382/272; 348/639; 348/668; 348/568; 348/455; 348/456; 348/445; 345/138; 345/202
[58] Field of Search ..................... 364/572, 715.02, 364/574, 575, 724.011, 724.05, 738, 825, 920.7; 395/200.77; 382/166, 260, 266, 272, 274, 232; 345/138, 147, 153, 202; 348/393, 400, 443–445, 454–456, 459, 472, 568, 639, 668

[56] References Cited

U.S. PATENT DOCUMENTS

| | | | |
|---|---|---|---|
| 4,665,436 | 5/1987 | Osborne et al. | 348/400 |
| 4,710,801 | 12/1987 | Kunzinger | 348/639 |
| 5,117,289 | 5/1992 | Farley et al. | 348/443 |
| 5,280,351 | 1/1994 | Wilkinson | 348/448 |
| 5,305,398 | 4/1994 | Klein et al. | 382/298 |
| 5,438,374 | 8/1995 | Yan | 348/620 |
| 5,526,295 | 6/1996 | Astle | 364/715.02 |

OTHER PUBLICATIONS

Alattar, Adnan M., "A Probabilistic Filter for Eliminating Temporal Noise in Time–Varying Image Sequences", Multimedia Products Operation, Intel Corporation, IEEE, 1992, pp. 1491–1494.

Bosman, D. and W. Bakker, "Conditioning of Local Image Signal to Noise Ratio", Signal Processing III: Theories and Applications, 1986, pp. 861–864.

Chen, Cheng–Tie and Fure–Ching Jeng, "On Coding of Motion Vectors for Motion–Compensated Predicitve/Interpolative Video Coder", SPIE vol. 1605 Visual Communications and Image Processing '91: Visual Communication, pp. 812–821

Green, Roger, "Noise Impairment in Coded Video Signals and Possible Reduction Philosophy", IEEE Transactions on Broadcasting, vol. BC–30, No. 4, Dec. 1984, pp. 112–116.

Kennel, Glenn and Mysore Raghuveer, "Video Noise Reduction in Telecine Systems", SPIE vol. 1199 Visual Communications and Image Processing IV, 1989, pp. 71–77.

Wischermann, Gerhard, "Median Filtering of Video Signals13 A Powerful Alternative", Society of Motion Picture and Television Engineers, Inc. Journal, Jul. 1991, pp. 541–546.

*Primary Examiner*—Emanuel Todd Voeltz
*Assistant Examiner*—Tuan Q. Dam
*Attorney, Agent, or Firm*—Blakely, Sokoloff, Taylor & Zafman

[57] ABSTRACT

A method and apparatus for video filtering filters video frames by determining a set of frames to be used to generate a single filtered frame. This set of frames is then combined to generate a single combined image. In one embodiment, proportions of the luminances for each of four fields from two consecutive frames in an NTSC video signal are combined to generate the single combined frame.

23 Claims, 4 Drawing Sheets

METHOD AND APPARATUS FOR VIDEO FILTERING

BACKGROUND OF THE INVENTION

1. Field of the Invention

The present invention pertains to filtering processes for video images. More particularly, this invention relates to reducing noise in and improving compression ratios for video images.

2. Background

As computer technology advances, computer systems are finding expanded uses in a wide variety of personal, academic and business fields. One such use is for the storage, display and transmission of video images. The storage and display of video images is very beneficial, for example, in a wide variety of multimedia and video conferencing applications. Additionally, transmitting video images allows video conferencing environments to exist, which allows physically separated individuals to observe one another while talking.

Storing and transmitting video images, however, typically requires a large amount of storage space. For example, one common video conferencing format provides a display area with 120×160 resolution. The display area contains 19,200 pixels, each of which can have any one of the available colors. If the display has a color resolution of 256 colors (which can be represented using 8 bits), then the storage size of an entire-display image is approximately 19 kilobytes, which is the amount of memory necessary to store the image. Furthermore, video typically operates at a rate of 30 frames per second, when showing motion. Thus, under the example, five seconds of video requires approximately 2.8 Megabytes of storage space. Similarly, transmission of the video image sequence requires a transfer rate of 570 kilobytes per second.

Compression algorithms are often used to reduce the storage space required for video images. A wide variety of compression algorithms are known to those skilled in the art. However, problems can occur with compression algorithms when noise exists in the image. Noise represents spatial differences within an image and temporal differences between multiple images which do not exist in the actual image input to the system. Noise can result, for example, due to camera jitter while receiving the image or inaccuracies resulting from an analog to digital conversion.

There are several disadvantages to noise in video images. One such disadvantage is the visual perception of noise. Noise results in a difference between the image being displayed by the system and the image as it was input to the system, thereby resulting in an inaccurate image being displayed as representative of the original input image. Additionally, noise degrades the performance of the compression algorithm. That is, the compression algorithm needlessly attempts to account for the differences in an image or between images created by the noise. Thus, it would be beneficial to provide a system which reduces the amount of noise in video images.

Typically, three types of filtering have been used prior to compressing an image in order to reduce noise: spatial filtering, temporal filtering, and spatio-temporal filtering. In spatial filtering, each image is filtered individually, without taking into account the motion between frames. Images are filtered by taking into account the values of surrounding pixels in determining the value for a particular pixel. Spatial filtering typically results in smoothing out the edges of objects being displayed, and blurring details in the objects.

In temporal filtering, an attempt is made to identify the motion between image frames. Typically, two frames are separated into blocks and an attempt is made to identify the motion of the blocks between the frames. Then, the data for the block is stored once along with a motion vector indicating the motion of the block. Temporal filtering, however, can result in the unnecessary expenditure of computational resources when a significant amount of motion is occurring in the images or noise exists in the images. This is due to the fact that, regardless of the actual detail of an object, an object is perceived as being blurry by the human eye if the object is moving fast enough. Thus, a large amount of computational effort may be spent to maintain accurate detail in a series of frames, even though when the series of frames is actually displayed the observer is unable to perceive the detail.

Temporal filtering typically performs poorly when there is a significant amount of temporal noise present. For example, noise in a series of images may be interpreted by the temporal filtering process as movement. Thus, the noise would remain part of the image, even though it should be removed. Furthermore, in some cases, temporal filtering algorithms may confuse temporal noise with the motion and thus generate erroneous values of motion vectors.

Spatio-temporal filtering combines aspects of both spatial filtering and temporal filtering. In spatio-temporal filtering, an attempt is made to identify motion between image frames, as is done in temporal filtering. Additionally, images are filtered by taking into account the values of surrounding pixels in determining the value for a particular pixel, as is done in spatial filtering. Although spatio-temporal filters can be an improvement over temporal filtering, spatio-temporal filters still tend to work poorly in situations where temporal filters work poorly. Additionally, spatio-temporal filters typically require significantly more computational effort than either spatial filters or temporal filters alone.

Thus, it would be beneficial to provide a system which efficiently filters images to reduce noise in the images. Additionally, it would be beneficial to provide a system which improves the compression ratios which can be obtained by a compression algorithm, thereby reducing the amount of storage space needed to store the images and reducing bandwidth requirements for transferring images.

One additional concern in computer systems is the performance or speed of the system. The display, storage and transmission of a large number of video images requires substantial computational effort, with faster computer systems being able to manipulate video images more quickly. This computing power, however, can be very expensive. Therefore, if the amount of time spent on displaying, storing or transmitting video images is reduced, the system would be able to manipulate video images more efficiently. Thus, it would be beneficial to provide a system which reduces the computational energy used to filter images.

The present invention provides for these and other advantageous results.

SUMMARY OF THE INVENTION

A method and apparatus for video filtering is described herein. The present invention determines a set of frames to be used to generate a single filtered frame. This set of frames is then combined to generate a single combined image. In one embodiment, proportions of the luminances for each of four fields from two consecutive frames in an NTSC video signal are combined to generate the single combined frame.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
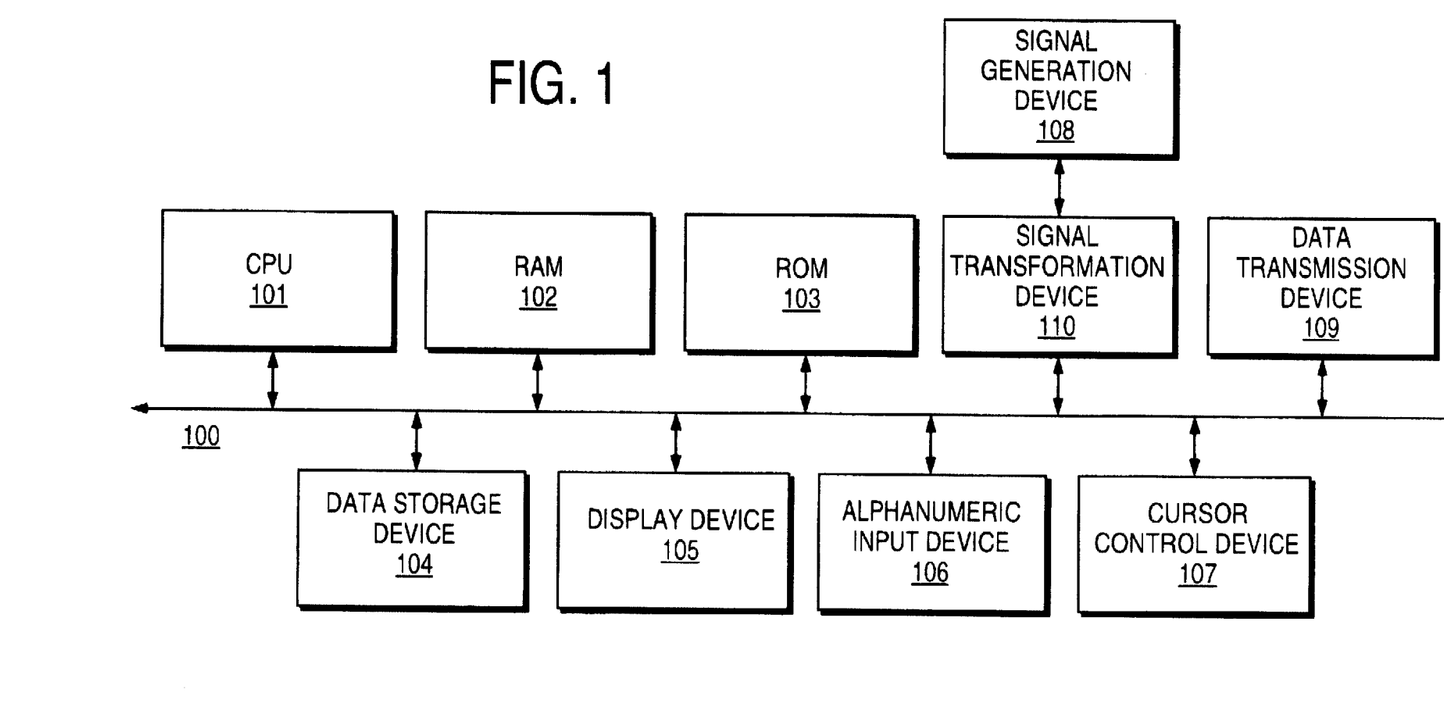
FIG. 1 is a computer system used by one embodiment of the present invention illustrated in block diagram format.

In general, a computer system used by one embodiment of the present invention is illustrated in block diagram format in FIG. 1. The system comprises a bus 100 for communicating information and a central processor (CPU) 101 coupled with bus 100 for processing information and instructions. In one embodiment, CPU 101 is an Intel® architecture compatible microprocessor; however, the present invention may utilize any type of microprocessor, including multiple processors of different types. The system also includes a random access memory (RAM) 102 coupled with bus 100 for storing information and instructions for processor 101, a read only memory (ROM) 103 coupled with bus 100 for storing static information and instructions for processor 101, a data storage device 104 such as a magnetic disk and disk drive or CD-ROM and drive coupled with bus 100 for storing information (such as video data) and instructions, a display device 105 coupled to bus 100 for displaying information to the computer user, an alphanumeric input device 106 including alphanumeric and function keys coupled to bus 100 for communicating information and command selections to processor 101, a cursor control device 107 coupled to bus 100 for communicating user input information and command selections to processor 101, and a signal generating device 108 coupled with a signal transformation device 110 which is coupled to bus 100 for communicating data to processor 101 or for displaying images on display device 105.

In one embodiment of the present invention signal generation device 108 includes, as an input device, a standard video camera to input video data to be processed and stored by the computer system. Signal generation device 108 includes an analog to digital converter to transform analog video data to digital form which can be processed by the computer system. In one embodiment, signal generation device 108 also includes a video cassette player to input stored video data to processor 101 and the remainder of the system over bus 100.

In one embodiment, signal transformation device 110 is a Philips SAA716 digital video to PCI bus interface, available from Philips Semiconductors of Englewood, Colo. However, it is to be appreciated that the present invention can use any of a wide variety of conventional signal transformation devices capable of transforming video data from the signal generation device format to digital format and transferring the data to the bus. In one implementation, signal generation device 108 also includes well-known video processing hardware to transform digital video data to display signals for display device 105, thereby creating a visual output.

In one embodiment of the present invention, data transmission device 109 is also coupled to bus 100. Data transmission device 109 operates to send and receive data (such as video and/or audio data) to and from other computer systems. In one implementation, data transmission device 109 is a conventional modem. Alternatively, data transmission device 109 may be a conventional ISDN interface coupled to an ISDN line.

The display device 105 utilized with the computer system and the present invention may be a liquid crystal device, cathode ray tube, or other display device suitable for creating graphic images and alphanumeric characters (and ideographic character sets) recognizable to the user. Cursor control device 107 allows the computer user to dynamically signal the two dimensional movement of a visible symbol (e.g., a pointer) on a display screen of the display device 105. Many implementations of the cursor control device are known in the art including a trackball, trackpad, mouse, joystick or special keys on alphanumeric input device 105 capable of signaling movement of a given direction or manner of displacement. It is to be appreciated that the cursor may also be directed and/or activated via input from the keyboard using special keys and key sequence commands. It is to be appreciated that the input cursor directing device or push button may consist any of those described above and specifically is not limited to the mouse cursor device.

Certain implementations of the present invention may not require nor include all of the above components. For example, the system may not include cursor control device 107. Alternatively, certain implementations of the present invention may include additional processors or other components. For example, a second processor identical to processor 101 may be included, or a graphics co-processor may be added to the computer system. By way of another example, the computer system may include an I/O bus and a bridge between the I/O bus and bus 100. Processor 101, RAM 102 and ROM 103 may be coupled to bus 100, and all other devices may be coupled to the I/O bus.

In one embodiment, the present invention is implemented as a series of software routines run by the computer system of FIG. 1. In one implementation, these software routines are written in the C programming language. However, it is to be appreciated that these routines may be implemented in any of a wide variety of programming languages. In an alternate embodiment, the present invention is implemented in discrete hardware or firmware.

Figure 2:
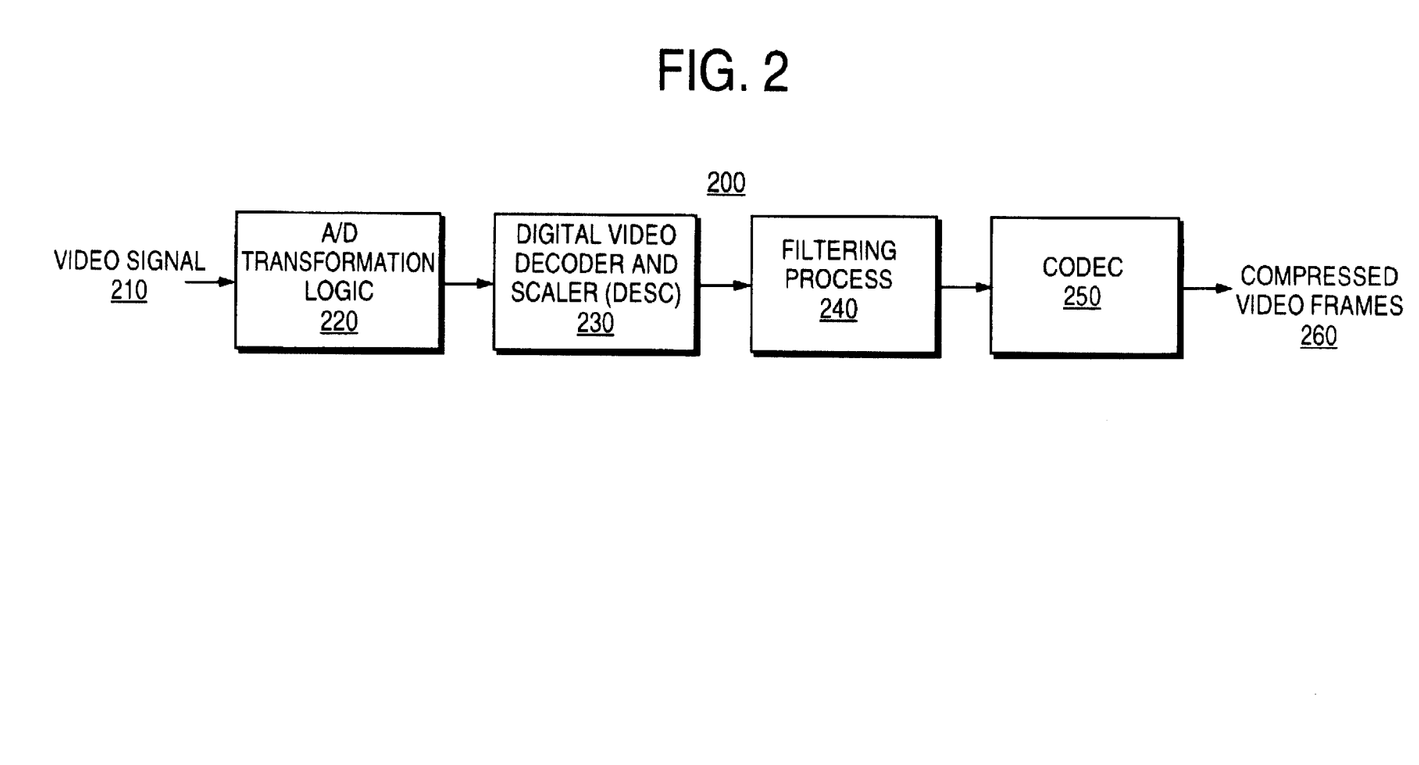
FIG. 2 is a block diagram showing the functional components used in filtering and compressing video images according to one embodiment of the present invention.

FIG. 2 is a block diagram showing the functional components used in filtering and compressing video images according to one embodiment of the present invention. FIG. 2 shows a system 200 which includes Analog/Digital (A/D) transformation logic 220, digital video decoder and scaler logic (DESC) 230, filtering process 240, and coder/decoder (codec) logic 250.

System 200 receives as input a video signal 210. Video signal 210 is a signal which represents one or more video frames. For example, video signal 210 can be a series of video frames which, when displayed sequentially, display a movie. Alternatively, video signal 210 can be a series of video frames which are the real-time visual images of the individual(s) of one side of a video conference. In one embodiment of the present invention, video signal 210 is a conventional video signal conforming to the National Television Standard Committee (NTSC) format.

Video signal 210 can be provided to system 200 in any of a wide variety of conventional manners. In one embodiment, video signal 210 is an analog signal input from a conventional video camera. In one implementation, the video camera is a Proshare™ video camera. Alternatively, video signal 210 may be input from a storage device, such as a videocassette player or CD-ROM. It should be noted that if the video signal from a storage device is in a digital format, A/D transformation logic 220 and DESC 230 can be bypassed, as discussed in more detail below.

Video signal 210 is input to A/D transformation logic 220. When video signal 210 is received in analog form, AND transformation logic 220 transforms video signal 210 to a digital form which can be processed by the rest of system 200. The conversion of signals in analog form to signals in digital form is well-known to those skilled in the art, and thus will not be discussed further.

DESC 230 provides color decoding and scaling logic for the digitized input signal. In one embodiment of the present invention, DESC 230 is the CMOS circuit SAA7194 available from Philips Semiconductors. The SAA7194 circuit combines the functions of a digital multistandard decoder (Philips SAA7191B) and a digital video scaler (Philips SM7186). The DESC allows a user of system 200 with controls to adjust luminance, brightness, contrast, chroma gain, and chroma saturation. A further discussion of these circuits can be found in the *Desktop Video Data Handbook*, pp. 259–310, Philips Semiconductors, 1993.

DESC 230 outputs the video signal to filtering process 240. In one embodiment, filtering process 240 reduces digital noise in the video signal and performs temporal filtering according to the present invention in order to improve the compression ratio when the image is later compressed. Filtering process 240 generates and outputs a series of filtered video frames, as discussed in more detail below with reference to FIG. 3.

In an alternate embodiment of the present invention, video signal 210 is received in digital format. For example, video signal 210 may originate from data stored on a CD-ROM, digital video tape, or a magnetic disk. When video signal 210 is in digital form, system 200 receives the video input as one or more scaled and digitized frames of video at a typical rate of between 10 and 30 fps. Thus, in this embodiment, A/D transformation logic 220 and DESC 230 are not necessary and video signal 210 is input directly to filtering process 240.

The filtered video frames are then output to the codec 250. Codec 250 compresses the frames which are received from filtering process 240. In one embodiment, codec 250 is the Indeo™ codec, available from Intel Corporation of Santa Clara, Calif. It is to be appreciated, however, that any of a wide variety of codecs using any of a wide variety of compression algorithms can be used as codec 250.

In an alternate embodiment of the present invention, the filtered video frames from filtering process 240 are not input to codec 250. In this alternate embodiment, the filtered video frames are transferred to another device in the computer system, such as a data storage device, in an un-compressed format.

Codec 250 outputs a series of compressed video frames 260. The video frames 260 are a filtered and compressed representation of the input video signal 210. The compressed video frames 260 can be output to a wide variety of devices. For example, video frames 260 may be stored in a storage device, such as a magnetic disk. Alternatively, video frames 260 may be transferred to a second computer, such as the other computer in a video conferencing system.

Figure 3:
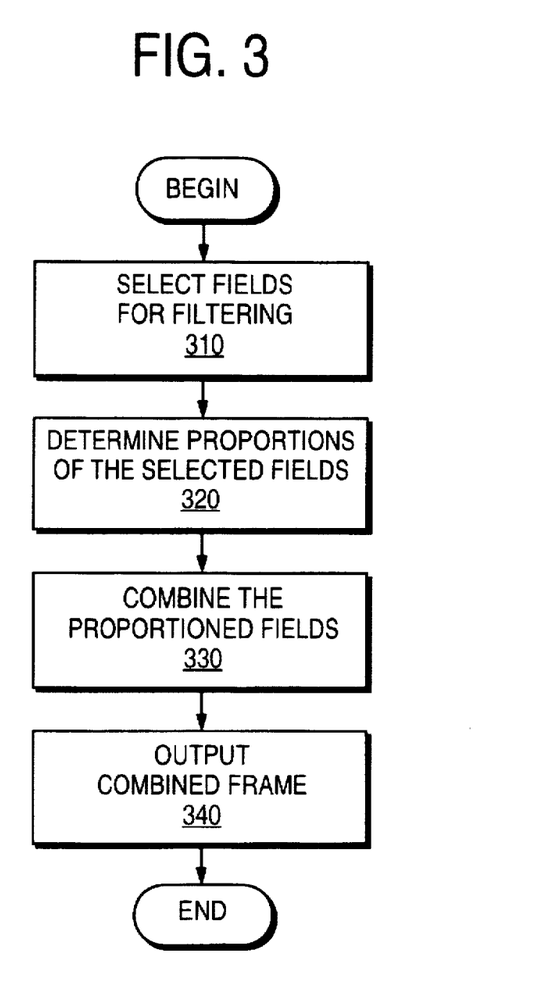
FIG. 3 is a flowchart showing the steps followed to filter video images according to one embodiment of the present invention.

FIG. 3 is a flowchart showing the steps followed to filter video images according to one embodiment of the present invention. The filtering process 240 first selects the fields for filtering, step 310. Each video frame comprises two fields, typically referred to as even and odd fields. The even field contains even lines and the odd field contains odd lines. The fields exist due to the method used by many conventional television and video systems to generate their displays. Typically, a conventional television system generates its display by using an electron gun(s) to illuminate each line on the display screen. The electron gun illuminates a single line at a time and typically starts at the top of the screen. It illuminates every other line as it travels down the screen, then resets itself to the top of the screen once it reaches the bottom. Thus, two vertical passes (that is, fields) of the electron gun generate a single frame. Video signals which use two fields to generate a single frame are often referred to as "interlaced" signals. Video input devices (e.g., conventional video cameras and video cassette players) usually generate interlaced video signals.

Figure 4:
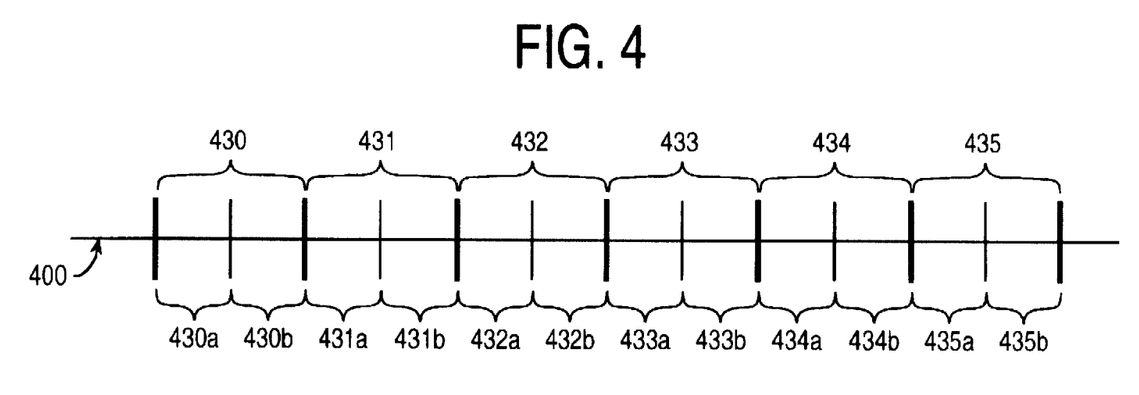
FIG. 4 is an example of a series of video frames and fields according to one embodiment of the present invention.

FIG. 4 shows an example of a series of video frames and fields. A series of video frames 400 is shown. The series of frames 400 includes multiple fields, such as 430a, 430b, 431a, 431b, etc. In the example of FIG. 4, labels with "a" (e.g., 430a) refer to odd fields, and labels with "b" (e.g., 430b) refer to even fields. A single frame is comprised of two consecutive fields (one odd and one even), such as frames 430 and 431.

Returning to FIG. 3, in step 310 the present invention selects a number of fields from the video frames. In one embodiment of the present invention, an even number of consecutive fields is selected so as to have an equal number of even and odd fields. In one implementation, four consecutive fields are selected, corresponding to two consecutive frames. However, it is to be appreciated that any number of fields can be selected in step 310.

The filtering process then determines a proportion of the luminance of each of the selected fields, step 320. The luminance of a given pixel within a frame represents the light intensity or brightness of that pixel. In one embodiment, the luminance of a color pixel is determined by taking proportions of the red, green and blue video signals for that pixel. In one implementation, the proportions are 0.30 of the red video signal, 0.59 of the green video signal, and 0.11 of the blue video signal. However, it is to be appreciated that other conventional methods can also be used to determine the luminance. The luminance of pixels within a video image is well-known to those skilled in the art, and thus will not be discussed further.

For the ease of notation, the luminance value of a pixel in column i and line j of a display sampled at the moment t can be called $I_{FR}(i,j,t)$. We can use similar notation for a pixel in column i, line p of the odd field at time t; that is, $I_a(i,p,t)$. We can also use similar notation for a pixel in column i, line n of the even field at time t; that is, $I_b(i,n,t)$.

In step 320, a proportion for each of the fields is determined. That is, a coefficient is applied to each of the luminance values for every pixel in the field. The resulting values are then combined to generate a filtered output frame.

In one implementation, steps 320 and 330 are performed according to the following calculations.

For a sequence of frames with even numbers of lines, j in $I_{FR}(i,j,t)$ varies from 1 to 2·N (that is, j=1, 2, 3, . . . , 2·N), p in $I_a(k,p,t)$ varies from 1 to N (that is, p=1, 2, 3, . . . , N), and n in $I_b(m,n,t)$ varies from 1 to N (that is, n=1, 2, 3, . . . , N).

For the pixels in odd lines the luminance in the filtered frame is equal to:

$$I_{FR}(i,2 \cdot n-1,t)=\tfrac{3}{8} \cdot I_a(i,n,t-1)+\tfrac{1}{8} \cdot I_b(i,n,t-1)+\tfrac{3}{8} \cdot I_a(i,n,t)+\tfrac{1}{8} \cdot I_b(i,n,t) \quad (1)$$

For the pixels in even lines, the luminance in the filtered frame is equal to:

$$I_{FR}(i,2n,t)=\tfrac{3}{8} \cdot I_a(i,n+1,t-1)+\tfrac{1}{8} \cdot I_b(i,n,t-1)+\tfrac{3}{8} \cdot I_a(i,n+1,t)+\tfrac{1}{8} \cdot I_b(i,n,t) \quad (2)$$

For the pixels in the last line (that is, j=2·N), the luminance in the filtered frame is equal to:

$$I_{FR}(i,2 \cdot N,t)=\tfrac{1}{2} I_b(i,N,t-1)+\tfrac{1}{2} I_b(i,N,t) \quad (3)$$

In calculations (1), (2) and (3), $I_a$ and $I_b$ are as defined above, t refers to the current frame and t−1 refers to the previous frame.

Thus, the fields of two consecutive frames of video are combined to generate the combined frame. That is, as shown in calculation (1), the pixels of the even and odd fields of the current frame (that is, at time t) and the previous frame (that is, at time t−1) are combined to generate the odd lines of the combined frame. Similarly, as shown in calculation (2), the pixels of the even and odd fields of the current frame the previous frame are combined to generate the even lines of the combined frame. The lines of the even or odd field used to generate the luminance of a particular pixel for the combined frame are as shown in calculations (1), (2), and (3).

In one embodiment, the set of coefficients applied to the fields is {⅜, ⅛, ⅜, ⅛}, as shown above. In an alternative embodiment, the set of coefficients applied to the fields is {¼, ¼, ¼, ¼}. It is to be appreciated, however, that different combinations of the coefficients can also be used.

Thus, in steps 320 and 330, multiple fields are combined to produce a filtered frame. The visual effect of this combination is dependent on what action, if any, is taking place in the series of frames. For example, a particular object may be displayed in the frames which includes screen location A. If this object is not moving, then the luminance for location A should be the same for each of the frames. Any differences in the luminances would be due to noise. Thus, the combining of luminances of different frames results in filtering out noise. Furthermore, the filtering does not introduce a blurring effect because the combining process produces the same luminance for location A as in the frames being combined. However, if this object is in a different location in the series of frames, then the averaging of luminances has a blurring effect. That is, the combined frame is not as clear as the original frames because some detail in the figure is lost due to the combining process. However, the magnitude of this blurriness is dependent on the speed of the action in the original frames. Slow-moving action is blurred a little, whereas fast-moving action is blurred more.

It should be noted, however, that the blurring of the image in the combined frame does not necessarily result in an abnormally-blurred image being perceived by a viewer. This is due to the fact that individuals perceive fast moving objects as being blurred. For example, if a pen with a name engraved on it is moved quickly, an individual watching the pen would not be able to actually read the engraved name. That is, an individual does not actually see all of the details of a fast moving object. Thus, even though the combined frame may not contain all of the detail of the original frames, some, if not all, of this detail would not have been perceived by the individual even if it were present due to the speed of the motion.

It should also be noted that the combining process of the present invention does not require significant computational effort. That is, the combining of fields as done in the present invention is a relatively quick and efficient process—the process does not require that time or computational effort be spent in an attempt to identify any motion within the series of frames. The luminances of fields can be combined in an efficient manner according to calculations (1) and (2), without expending time and energy to distinguish between movement and non-movement between the frames.

Furthermore, the combining process of the present invention filters the series of images before it is output to the codec. This filtering improves the compression ratios which can be achieved by the codec. Compression ratios are increased due to the combining process. That is, by combining multiple frames together, fewer changes will occur between frames being compressed. Fewer changes will occur because the details of moving objects have been blurred to some extent, thereby reducing the magnitude of the change which occurs between the frames.

Additionally, as discussed above, a certain amount of noise can exist in the video frames. This noise results in changes in the values of luminance being displayed even though the object which includes the noise does not change or move. Thus, the codec expends additional computational effort to compress the noise as if it represents the actual changes in the frame. The combining process of the present invention, however, filters out some of this noise, thereby improving compression ratios.

It should also be noted that, in some instances, not all of the fields are used by the present invention in generating the combined frame output. For example, data can be captured by the present invention from the input video stream at a rate of 30 frames per second, which is 60 fields per second. As discussed above, in one embodiment the combined frame is generated by combining four fields. Thus, if the present invention were outputting combined frames at a rate of 15 combined frames per second, then each of the four fields would be incorporated into one of the combined frames. However, if the present invention were outputting combined frames at a rate of 10 combined frames per second, then only four of every six fields would be incorporated into one of the combined frames.

In embodiments of the present invention where fewer than all of the fields are incorporated into the combined frames, certain fields are dropped from the filtering process. In one implementation which outputs combined frames at a rate of 10 combined frames per second, the fields are divided into contiguous groups of six fields each and the first four fields of each such group are incorporated into the combined frame in steps 320 and 330. For example, if only four of every six fields of the frames in FIG. 4 were incorporated into one combined frame, then fields 430a, 430b, 431a and 431b would be combined using calculations (1) and (2) above, and fields 432a and 432b would be dropped. The next combined frame would be generated starting with field 433a.

In alternate embodiments of the present invention, the output rate of combined frames of the present invention may be high enough that certain fields can be incorporated into multiple combined frames. In one implementation, this is accomplished by overlapping the frames. For example, if the present invention were outputting combined frames at a rate of 20 combined frames per second from an input video stream received at a rate of 30 frames per second, then there are 60 fields per second to combine. The overlapping can be shown by way of example in FIG. 4. The first combined frame would incorporate fields 430a, 430b, 431a and 431b. The second combined frame would then incorporate fields 431b, 432a, 432b and 433a, thereby resulting in an overlap of one field (that is, field 431b).

Once the combined frame is generated, the frame is output, step 340. In one embodiment, combined frames are output at a rate of 15 combined frames per second. The combined frame can be output to any of a wide variety of devices. In one embodiment, the combined frame is output to a codec. In an alternate embodiment, the combined frame is transferred directly to a storage device or a signal transmission device (such as a modem).

Thus, the present invention efficiently filters frames of video. The frames are combined such that portions of the images where motion is occurring are blurred slightly, with the amount of blurring being dependent on the rate of motion. This blurring both reduces noise and improves compression ratios. Additionally, noise is reduced in areas of the frames where no motion is occurring, thereby providing improved compression ratios and an image with reduced noise.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for video filtering has been described.

What is claimed is:

1. A method for generating luminance values for a combined frame representative of a plurality of video frames, the method comprising the steps of:

(a) identifying a set of fields corresponding to the plurality of video frames, wherein the set of fields includes an even field and an odd field for each frame of the plurality of video frames;

(b) combining values from each field of the set of fields to generate a luminance value for a single pixel of the combined frame;

(c) repeating the combining step (b) for each of a plurality of pixels of the combined frame; and (d) outputting the combined fame as representative of the plurality of video frames.

2. The method of claim 1, further comprising the steps of:

receiving the plurality of video frames in an analog format from a video camera; and converting the plurality of video frames from the analog format to a digitized format.

3. The method of claim 1, wherein the plurality of video frames comprises two video frames.

4. The method of claim 1, wherein the outputting step (d) comprises the step of transferring the combined frame to a compression process which compresses the combined frame.

5. The method of claim 1, wherein the combining step (b) comprises the step of averaging the luminances of pixels of each field of the set of fields.

6. The method of claim 1, wherein the identifying step (a) comprises the steps of:

identifying a first field for a first frame of the plurality of video frames;

identifying a second field for the first frame;

identifying a third field for a second frame of the plurality of video frames; and identifying a fourth field for the second frame.

7. The method of claim 6, wherein the combining step (b) comprises the steps of:

determining a first proportion of the luminance of a point of the first field;

determining a second proportion of the luminance of a point of the second field;

determining a third proportion of the luminance of a point of the third field;

determining a fourth proportion of the luminance of a point of the fourth field; and summing the first proportion, the second proportion, the third proportion, and the fourth proportion.

8. The method of claim 7, wherein the first proportion is one-eighth, the second proportion is three-eighths, the third proportion is three-eighths, and the fourth proportion is one-eighth.

9. An apparatus comprising:

a storage device which stores a plurality of video frames; and a processor, coupled to the storage device, to identify a set of fields corresponding to the plurality of video frames, wherein the set of fields includes an even field and an odd field for each frame of the plurality of video frames, to combine, for each of a plurality of pixels of a combined frame, luminance values from each field of the set of fields to generate a value for a pixel of the combined frame, and to output the combined frame as representative of the plurality of video frames.

10. The apparatus of claim 9, wherein the processor averages the luminance values of pixels of each field of the set of fields.

11. The apparatus of claim 9, wherein the processor identifies a first field for a first frame of the plurality of video frames, identifies a second field for the first frame, identifies a third field for a second frame of the plurality of video frames, and identifies a fourth field for the second frame.

12. The apparatus of claim 11, wherein the processor also determines a first proportion of the luminance value of a point of the first field determines a second proportion of the luminance value of a point of the second field, determines a third proportion of the luminance value of a point of the third field, determines a fourth proportion of the luminance value of a point of the fourth field, and sums the first proportion, the second proportion, the third proportion, and the fourth proportion.

13. A system comprising:

a bus;

a storage device, coupled to the bus, which stores a plurality of video frames; and a processor coupled to the bus, to identify a set of fields corresponding to the plurality of video frames, wherein the set of fields includes an even field and an odd field for each frame of the plurality of video frames, to combine, for each of a plurality of pixels of a combined frame, luminance values from each field of the set of fields to generate a value for a pixel of the combined frame, and to output the combined frame as representative of the plurality of video frames.

14. The system of claim 13, further comprising:

an input device, coupled to the buss which receives the plurality of video frames in an analog format; and a digitizing device coupled to the bus which converts the plurality of video frames from the analog format to a digitized format.

15. The system of claim 13, wherein the processor identifies a first field for a first frame of the plurality of video frames, identifies a second field for the first frame, identifies a third field for a second frame of the plurality of video frames, and identifies a fourth field for the second frame.

16. The system of claim 15, wherein the processor also determines a first proportion of the luminance value of a point of the first field determines a second proportion of the luminance value of a point of the second field, determines a third proportion of the luminance value of a point of the third field, determines a fourth proportion of the luminance value of a point of the fourth field, and sums the first proportion, the second proportion, the third proportion, and the fourth proportion.

17. A machine-readable medium having stored thereon a plurality of instructions, designed to be executed by a processor, for implementing a function to identify a set of fields corresponding to a plurality of video frames, wherein the set of fields includes an even field and an odd field for each frame of the plurality of video frames, to combine, for each of a plurality of pixels of a combined frame, luminance values from each field of the set of fields to generate a value for a pixel of the combined frame, and to output the combined frame as representative of the plurality of video frames.

18. The machine-readable medium of claim 17, the plurality of instructions further including instructions for implementing a function to receive the plurality of video frames in an analog format from a video camera, and to convert the plurality of video frames from the analog format to a digitized format.

19. The machine-readable medium of claim 17, wherein the plurality of video frames comprises two video frames.

20. The machine-readable medium of claim 17, the plurality of instructions further including instructions for implementing a function to average the luminance values of pixels of each field of the set of fields.

21. The machine-readable medium of claim 17, the plurality of instructions further including instructions for implementing a function to identify a first field for a first frame of the plurality of video frames, to identify a second field for the first frame, to identify a third field for a second frame of the plurality of video frames, and to identify a fourth field for the second frame.

22. The machine-readable medium of claim 21, the plurality of instructions further including instructions for implementing a function to determine a first proportion of the luminance value of a point of the first field, to determine a second proportion of the luminance value of a point of the second field, to determine a third proportion of the luminance value of a point of the third field, to determine a fourth proportion of the luminance value of a point of the fourth field, and to sum the first proportion, the second proportion, the third proportion, and the fourth proportion.

23. The machine-readable medium of claim 22, wherein the first proportion is one-eighth, the second proportion is three-eighths, the third proportion is three-eighths, and the fourth proportion is one-eighth.

* * * * *